United States Patent [19]

Kishi

[11] Patent Number: 5,499,275
[45] Date of Patent: Mar. 12, 1996

[54] CLOCK RECOVERY SYSTEM CAPABLE OF AUTOMATICALLY SWITCHING A DIRECTION OF A CLOCK PULSE SEQUENCE FROM ONE TO ANOTHER

[75] Inventor: Kaori Kishi, Tokyo, Japan

[73] Assignee: NEC Corporation, Tokyo, Japan

[21] Appl. No.: 306,732

[22] Filed: Sep. 15, 1994

Related U.S. Application Data

[63] Continuation of Ser. No. 903,345, Jun. 24, 1992, abandoned.

[30] Foreign Application Priority Data

Jun. 24, 1991 [JP] Japan .................................. 3-151866

[51] Int. Cl.⁶ .................................................. H04L 7/00
[52] U.S. Cl. ........................................ 375/357; 370/16.1
[58] Field of Search ................................ 375/357, 356; 370/16.1, 85.12, 85.15, 16; 371/11.1, 11.2

[56] References Cited

U.S. PATENT DOCUMENTS

| | | | |
|---|---|---|---|
| 4,593,154 | 6/1986 | Takeda et al. | 370/16.1 |
| 4,930,119 | 5/1990 | Kobayashi et al. | 370/16.1 |
| 4,937,811 | 6/1990 | Harris | 370/16.1 |
| 5,199,025 | 3/1993 | Miwa | 370/16.1 |
| 5,307,353 | 4/1994 | Yamashita et al. | 370/16.1 |

*Primary Examiner*—Stephen Chin
*Assistant Examiner*—Hai H. Phan
*Attorney, Agent, or Firm*—Sughrue, Mion, Zinn, Macpeak & Seas

[57] ABSTRACT

In a clock recovery system for use in a ring-shaped synchronization network which comprises a master transmission device and a plurality of slave transmission devices, a clock pulse sequence is circulated in a predetermined direction from the master transmission device through the plurality of the slave transmission devices in a normal state and a fault indication signal is transmitted in the predetermined direction from one of the slave transmission devices that detects interruption of the clock pulse sequence. Responsive to the fault indication signal, the master transmission device transmits a switch indication signal in a reverse direction to the one slave transmission device so as to switch the direction of the clock pulse sequence in each slave transmission device. Responsive to the switch indication signal, the one slave transmission device transmits a switch completion signal to the master transmission device in the predetermined direction. Thus, the direction of the clock pulse sequence is automatically switched from the predetermined direction to the reversed direction.

8 Claims, 8 Drawing Sheets

1

CLOCK RECOVERY SYSTEM CAPABLE OF AUTOMATICALLY SWITCHING A DIRECTION OF A CLOCK PULSE SEQUENCE FROM ONE TO ANOTHER

This is a continuation of application Ser. No. 07/903,345 filed Jun. 24, 1992 abandoned.

BACKGROUND OF THE INVENTION

This invention relates to a clock recovery method and system for use in a ring-shaped synchronization network to recover a sequence of clock pulses.

A conventional ring-shaped synchronization network of the type described comprises a plurality of transmission devices which are connected through transmission lines or paths to one another in a ring shape and which are bidirectionally communicable with one another. In such a synchronization network, the transmission devices are classifiable into a master transmission device for delivering a sequence of clock pulses to the synchronization network and a plurality of slave transmission devices each of which is operable in response to the clock pulse sequence. The clock pulse sequence may be called a master clock pulse sequence and is circulated in a selected one of clockwise and counterclockwise directions that will be referred to as a selected direction. Each of the slave transmission devices is operated in accordance with an internal clock pulse sequence which is synchronized with the master clock pulse sequence.

Specifically, each of the slave transmission devices is supplied through the transmission line with the master clock pulse sequence from an upstream transmission device, such as the master or the slave transmission device, to produce the internal clock pulse sequence with reference to the master clock pulse sequence extracted by each slave transmission device. On the other hand, each slave transmission device transmits the master clock pulse sequence through the transmission line to a downstream transmission device which may be the slave or the master transmission device. Thus, network synchronization is established in the network by transmitting the master clock pulse sequence in the selected direction.

With this structure, it often happens that a fault takes place on the transmission line between two adjacent ones of the transmission devices and that the master clock pulse sequence can not be transferred to the downstream transmission device or devices in the selected direction. As a result, the network synchronization is frequently disturbed or stalled.

Herein, it is assumed that such a fault takes place on the transmission line for transmitting the master clock pulse sequence and that a specific one of the slave transmission devices detects the fault. In this event, the selected direction for the master clock pulse sequence may be switched to a reversed direction in the specific slave transmission device.

Heretofore, the direction of the master clock pulse sequence has been manually and successively switched from the selected direction to the reversed one until the specific transmission device. In addition, manual switching has also been carried out on recovery of the fault to change the direction from the reversed direction to the selected direction.

SUMMARY OF THE INVENTION

It is an object of this invention to provide a clock pulse recovering method and system, wherein network synchronization is not disturbed or installed even when a fault takes place on a slave transmission device.

It is another object of this invention to provide a clock pulse recovering method and system of the type described, which can automatically switch a direction of a master clock pulse sequence from a selected one to a reversed one or from the reversed one to the selected one.

A method to which this invention is applicable is for recovering a sequence of clock pulses in a ring-shaped synchronization network in which a master transmission device and a plurality of slave transmission devices are connected in a ring shape to one another and are communicable with one another in clockwise and counterclockwise directions. The clock pulse sequence is transmitted in a normal state from the master transmission device in a selected one of the clockwise and the counterclockwise directions. According to an aspect of this invention, the method comprises the steps of monitoring, in one of the slave transmission devices, interruption of the clock pulse sequence sent from the master transmission device in the selected one of the clockwise and the counterclockwise directions, to detect an extraordinary state different from the normal state, informing, from the one of the slave transmission devices to the master transmission device, of the interruption of the clock pulse sequence in the selected one of the clockwise and the counterclockwise directions, and transferring the clock pulse sequence from the master transmission device to the one of the slave transmission device in the remaining one of the clockwise and the counterclockwise directions that is reverse to the selected one of the clockwise and the counterclockwise directions.

According to another aspect of this invention, a clock pulse recovery system comprises a predetermined one of the slave transmission devices that comprises monitoring means for monitoring interruption of the clock pulse sequence sent from the master transmission device in the selected one of the clockwise and the counterclockwise directions, to detect an extraordinary state different from the normal state and informing means for informing the master transmission device of the interruption of the clock pulse sequence in the selected one of the clockwise and the counterclockwise directions. The master transmission device comprises transferring means for the clock pulse sequence to the predetermined one of the slave transmission devices in the remaining one of the clockwise and the counterclockwise directions that is reverse to the selected one of the clockwise and the counterclockwise directions.

DESCRIPTION OF THE PREFERRED EMBODIMENTS

Figure 1:
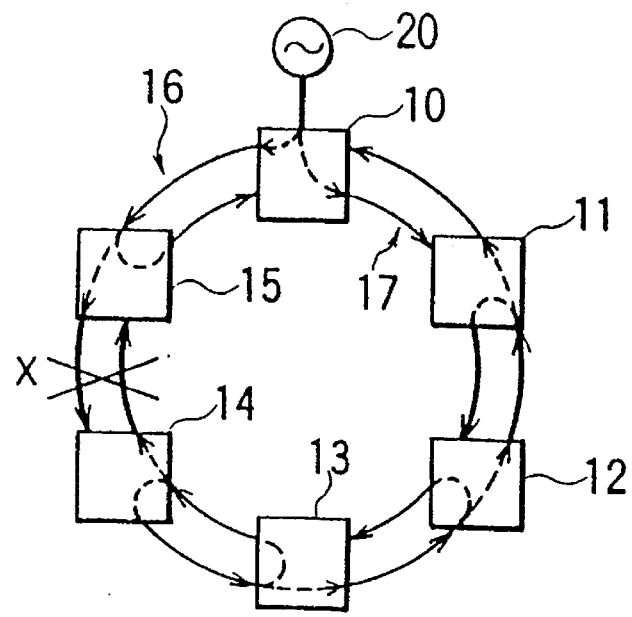
FIG. 1 is a block diagram for use in describing a conventional method of recovering a clock sequence on a transmission line.
Figure 2:
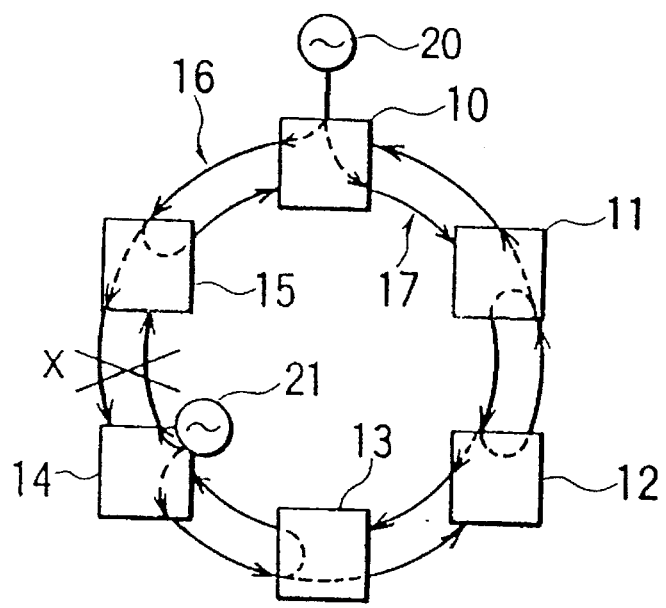
FIG. 2 is a similar block diagram for use in describing another conventional method of recovering a clock sequence.

Referring to FIG. 1, description will be made as regards a conventional clock recovery system which is for use in a ring-shaped synchronization network. The synchronization network illustrated in FIG. 1 comprises a master transmission device 10 and first through fifth slave transmission devices 11 to 15. The master and the first through fifth slave transmission devices 11 to 15 are connected to one another in a ring shape and are bidirectionally communicable with one another in counterclockwise and clockwise directions. In this connection, the master and the first through the fifth slave transmission devices 10 and 11 to 15 are connected through outer transmission lines or paths 16 and inner transmission lines or paths 17. As shown in FIGS. 1 and 2, a master clock generator 20 is attached to the master transmission device 10 and is assumed to successively deliver a sequence of master clock pulses to the slave transmission devices 15 to 11 in the counterclockwise direction through the outer transmission lines 16 in a normal state. Each of the first through the fifth slave transmission devices 11 to 15 extracts the master clock pulse sequence on the outer transmission lines 16 to internally produce internal clock pulses. Thus, each of the first through the fifth slave transmission devices 11 to 15 is operated in accordance with the internal clock pulses synchronized with the master clock pulse sequence and transmits data signals through the outer and the inner transmission lines 16 and 17 in the clockwise or counterclockwise direction in synchronism with the master clock pulse sequence.

With this structure, let a fault take place between the fifth and the fourth slave transmission devices 15 and 14, as symbolized by a crisscross in FIG. 1. In this case, the fourth slave transmission device 14 is supplied with no master clock pulse sequence. Stated otherwise, the master clock pulse sequence is interrupted by the fifth slave transmission device 15. On detection of such interruption of the master clock pulse sequence, the fourth through the first slave transmission devices 14 to 11 can not establish synchronization and are put out of a synchronous states.

In order to be put into the synchronous state again, the direction of the master clock pulse sequence may be switched from the counterclockwise direction to the clockwise direction. In this event, the first through the fourth slave transmission devices 11 to 14 should be successively switched to change the direction of the master clock pulse sequence from the counterclockwise direction to the clockwise direction. Practically, such switching in each slave transmission devices 11 to 14 is manually carried out.

Herein, it is surmised that such switching is at first manually carried out from the fourth slave transmission device 14 at which the interruption of the master clock pulse sequence is detected, as illustrated in FIG. 1. In this case, a loop is formed between the fourth and the third slave transmission devices 14 and 13, as shown in FIG. 1. When the loop is formed, any clock pulse sequence is produced from nowhere. Accordingly, it is inconvenient to start the switching operation of the master clock pulse sequence from the fourth slave transmission device 14.

Referring to FIG. 2, consideration may be made in the conventional clock recovery system about using an internal clock generator 21 of the fourth slave transmission device 14 on detection of the interruption of the master clock pulse sequence in the fourth slave transmission device 14. Specifically, let the fourth slave transmission device 14 be first switched from the master clock pulse sequence to an internal clock pulse sequence generated by the internal clock generator 21. In this case also, a loop is formed between the fourth and the third slave transmission devices 14 and 13, as illustrated in FIG. 2.

At any rate, switching the direction of the master clock pulse sequence should be successively started from the master transmission device 10. Otherwise, it is difficult to supply a clock pulse sequence to all of the transmission devices included in the network.

Referring to FIG. 3, a clock recovery system according to a first embodiment of this invention is applicable to a ring-shaped synchronization network similar to that illustrated in FIGS. 1 and 2. In this connection, the illustrated clock recovery system comprises similar parts designated by like reference numerals in FIGS. 1 and 2. As shown in FIG. 3(A), the master transmission device 10 and the first through the fifth slave transmission devices 11 to 15 are connected to one another in a ring shape through the outer transmission lines 16 and the inner transmission lines 17. It is assumed that the master clock pulse sequence is produced from the master clock generator 20 and is successively delivered from the master transmission device 10 in the counterclockwise direction to each of the fifth through the first slave transmission devices 15 to 11 through the outer transmission lines 16 in a normal state. An information signal is sent through the outer transmission lines 16 in the counterclockwise direction in synchronism with the master clock pulse sequence. It is to be noted that the first slave transmission device 11 can be supplied from the master transmission device 10 with the master clock pulse sequence through the inner transmission line 17. In addition, each of the slave transmission devices includes an internal clock generator for generating an internal clock pulse sequence, although not shown in FIG. 3(A). It is needless to say that the internal clock pulse sequence is synchronized with the master clock pulse sequence.

In any event, all of the transmission devices 10 to 15 are operated in synchronism with the master clock pulse sequence circulated in the counterclockwise direction in the normal state.

Figure 3A:
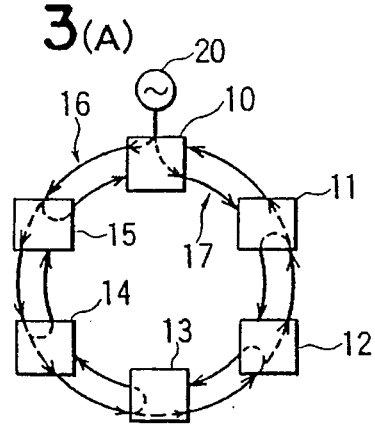
FIGS. 3(A) through (F) show a clock recovery method according to a preferred embodiment of this invention so as to describe each step of the recovery method.
Figure 3D:
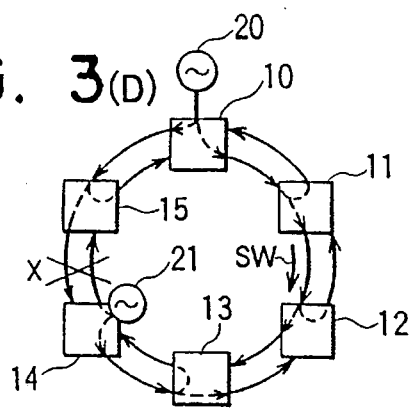
Figure 3B:
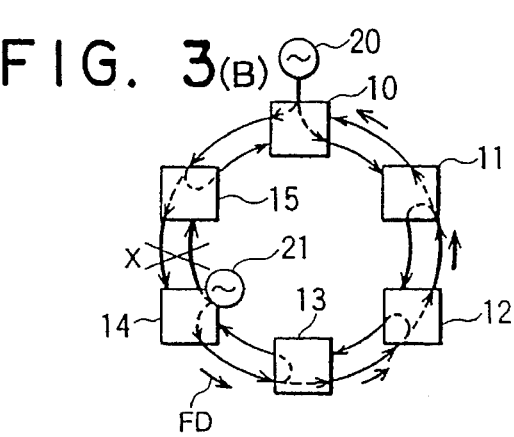

In FIG. 3(B), let a fault on the outer transmission line 16 take place at a point X between the fifth and the fourth slave transmission devices 15 and 14, as symbolized by a crisscross. In this case, the fourth transmission device 14 detects occurrence of the fault by monitoring interruption of the master clock pulse sequence in a manner to be described later. On detection of the occurrence of the fault, the fourth slave transmission device 14 is switched to the internal clock generator 21, as shown in FIG. 3(B). Subsequently, the fourth slave transmission device 14 produces a fault detection signal FD which is representative of detection of the fault, and which is arranged in an overhead portion of the data information signal. The fault detection signal is transmitted from the fourth slave transmission device 14 to the master transmission device 10 through the outer transmission lines 16 in the counterclockwise direction, as depicted at an arrow in FIG. 3(B). Thus, the fault detection signal is sent from the fourth slave transmission device 14 in synchronism with the internal clock pulse sequence of the fourth slave transmission device 14 and is successively transferred to the master transmission device 10 through the third, the second, and the first slave transmission devices 13, 12, and 11.

Figure 3E:
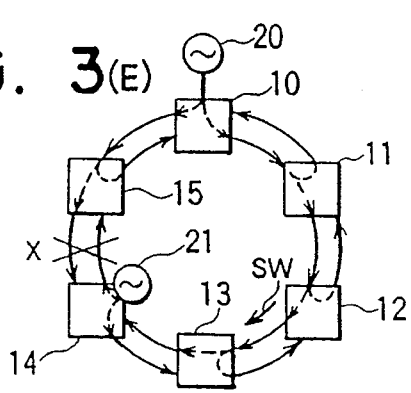
Figure 3C:
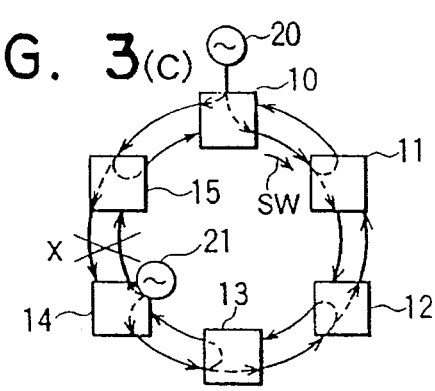

Supplied with the fault detection signal, the master transmission device 10 produces a switch indication signal SW indicative of switching the direction of the master clock pulse sequence from the counterclockwise direction to the clockwise direction, as shown in FIG. 3(C). Responsive to the switch indication signal SW, the first slave transmission device 11 switches the direction of the master clock pulse sequence. Specifically, the master clock pulse sequence is extracted from the inner transmission line 17 in the first slave transmission device 11 and sent from the first slave transmission device 11 to the second slave transmission device 12 in the clockwise direction through the inner transmission line 17. This shows that a clock source is switched in the first slave transmission device 11 from the second slave transmission device 12 to the master transmission device 10.

The first slave transmission device 11 transmits the switch indication signal SW to the second slave transmission device 12 through the inner transmission line 17 in the clockwise direction. Supplied with the switch indication signal SW, the second slave transmission device 12 switches the direction of the master clock pulse sequence from the counterclockwise direction to the clockwise one, as illustrated in FIG. 3(D).

As illustrated in FIG. 3(E), the second slave transmission device 12 transfers the switch indication signal SW to the third transmission device 13 through the inner transmission line 17 in the clockwise direction. Like the second slave transmission device 12, the third slave transmission device 13 carries out switch operation to receive the master clock pulse sequence sent in the clockwise direction and transmits the switch indication signal SW to the fourth slave transmission device 14 at which the fault is detected and which may be called a fault detection device hereinunder.

Figure 3F:
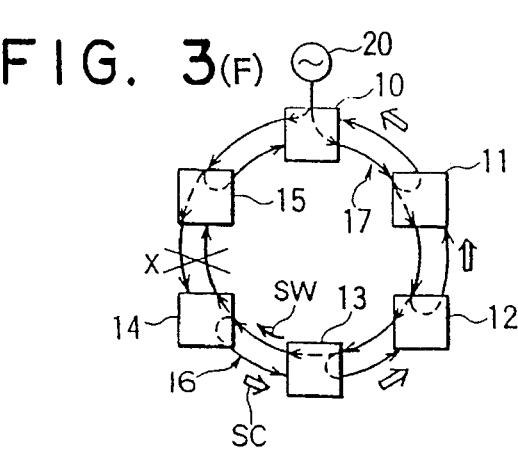

Supplied with the switch indication signal SW, the fault detection device, namely, the fourth slave transmission device 14 switches from the internal clock pulse sequence of the internal clock generator 21 to the master clock pulse sequence sent through the inner transmission line 17 in the clockwise direction. Thereafter, the fourth slave transmission device 14 produces a switch completion signal SC representative of completion of switching of the master clock pulse sequence. The switch completion signal SC is sent from the fault detection device through the third, the second, and the first slave transmission devices 13, 12, and 11 back to the master transmission device 10 in the counterclockwise direction, as illustrated in FIG. 3(F).

Thus, the first through the fourth slave transmission devices 11 to 14 are operated in synchronism with the master clock pulse sequence sent from the master transmission device 20 in the clockwise direction. In addition, the fifth slave transmission device 15 which is connected direct to the master transmission device 10 is directly supplied from the master transmission device 10 with the master clock pulse sequence in the counterclockwise direction even when the fault is detected between the fifth and the fourth slave transmission devices 15 and 14.

Referring to FIG. 4, description will be made as regards an operation carried out after a fault is recovered. Herein, it is assumed that the fault takes place at the point X between the fifth and the fourth slave transmission devices 15 and 14, like in FIG. 3. On recovery of the fault, the fourth slave transmission device 14 switches from the inner transmission line, namely, a clockwise transmission line 17 back to the outer or a counterclockwise transmission line 16 so as to extract the master clock pulse sequence from the counterclockwise transmission line 16. Thereafter, the fourth slave transmission device 14 delivers a return request signal RR to the third slave transmission device 13, as shown in FIG. 4(A). The return request signal RR is indicative of switching from the clockwise direction of the master clock pulse sequence back to the counterclockwise direction and transmitted by the use of an overhead of an information data signal.

Figure 4A:
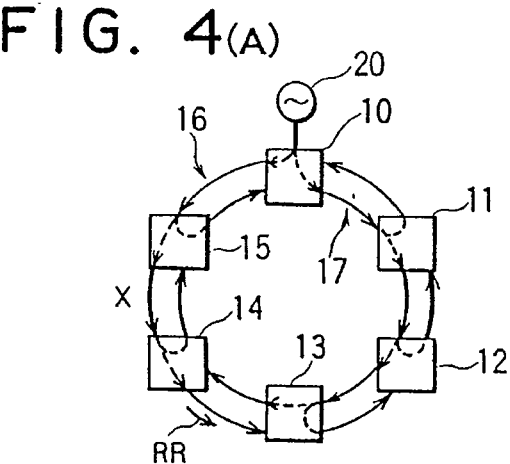
FIGS. 4(A) through (D) show the clock recovery method illustrated in FIG. 3 so as to describe another step of the recovery method.
Figure 4B:
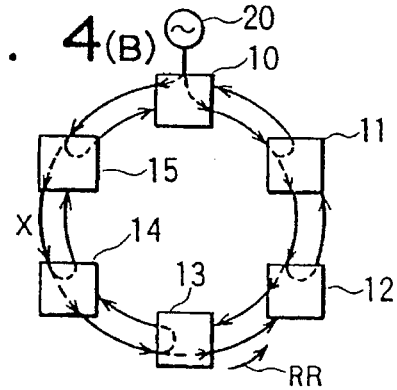
Figure 4C:
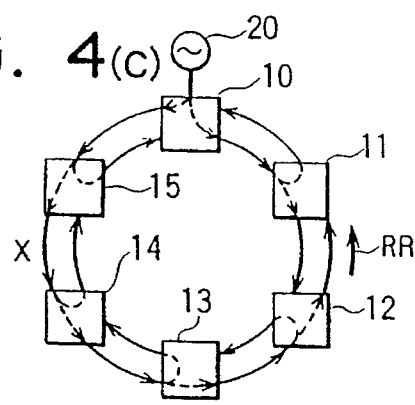
Figure 4D:
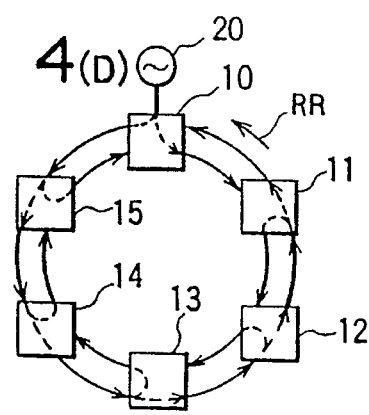

Supplied with the return request signal, the third slave transmission device 13 switches the direction of the master clock pulse sequence from the clockwise direction to the counterclockwise direction and delivers the return request signal to the second slave transmission device 12, as illustrated in FIG. 4(B).

Similar operation is successively carried out in each of the second and the first slave transmission devices 12 and 11 so as to successively switch the direction of the master clock pulse sequence from the clockwise direction to the counterclockwise direction and to send the return request signal to the following device.

Thus, when the return request signal RR is transmitted to the master transmission device 10, network synchronization is established in a state before occurrence of the fault. As a result, the master clock pulse sequence is transmitted through the outer transmission lines 16 in the counterclockwise direction.

Figure 5:
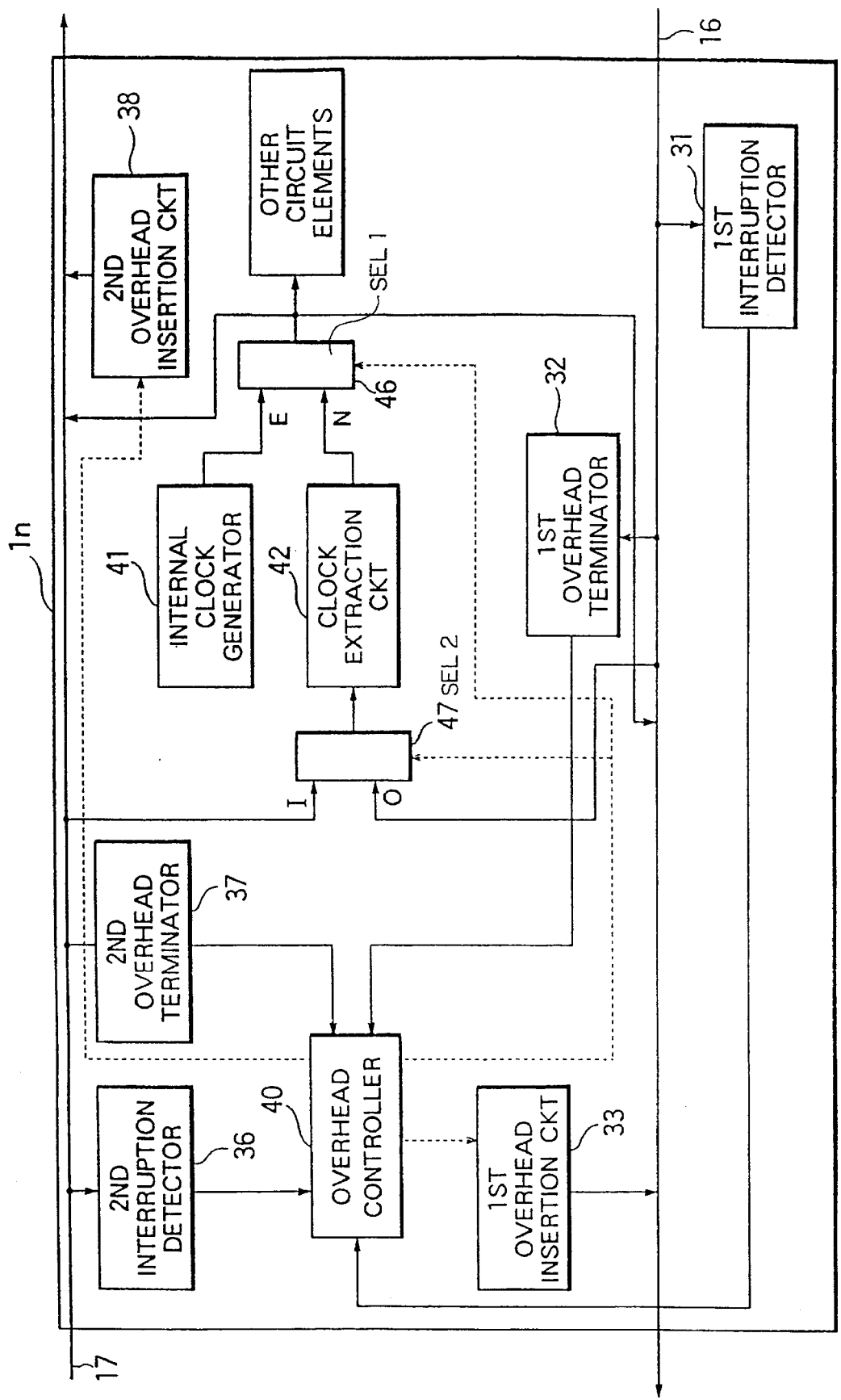
FIG. 5 is a block diagram of a slave transmission device illustrated in FIGS. 3 and 4.

Referring to FIG. 5, each of the slave transmission devices 11 to 15 is similar in structure and operation to one another and is depicted at 1n, where n is a natural number. The illustrated slave transmission device 1n is connected to the outer transmission line 16 and the inner transmission line 17 both of which are operable to transmit outer and inner information signals in the counterclockwise and the clockwise directions in the above-mentioned manner, respectively. The illustrated slave transmission device 1n comprises a first interruption detector 31, a first overhead terminator 32, and a first overhead insertion circuit 33 all of which are connected to the outer transmission line 16. The first interruption detector 31 serves to detect interruption of a clock pulse sequence sent from an upstream transmission device and to produce an interruption detection signal representative of detection of the interruption while the first overhead terminator 32 extracts an overhead from the outer information signal sent through the outer transmission line 16 to produce an overhead signal representative of the overhead. The first overhead insertion circuit 33 acts to insert an overhead into the outer information signal sent to a next or a downstream one of the transmission devices.

Likewise, the slave transmission device 1n further comprises a second interruption detector 36, a second overhead terminator 37, and a second overhead insertion circuit 38 all of which are connected to the inner transmission line 17 and which are operable in manners similar to the first interruption detector 31, the first overhead terminator 32, and the first overhead insertion circuit 33, respectively.

The interruption detection signals and the overhead signals are sent from the first and the second interruption detectors 31 and 36 and the first and the second overhead terminators 32 and 37 to an overhead controller 40. The overhead controller 40 analyzes the interruption detection signals and the overhead signals to deliver control signals to various portions of the slave transmission device 1n, as depicted at broken lines in FIG. 5, as mentioned later in detail.

In FIG. 5, the illustrated slave transmission device 1n further comprises an internal clock generator 41 which is the same as the internal clock generator 21 illustrated in FIG. 3, a clock extraction circuit 42, a first selector 46 connected to both the internal clock generator 41 and the clock extraction circuit 42, and a second selector 47 connected to both the outer and the inner transmission lines 16 and 17. The first and the second selectors 46 and 47 are controlled by the overhead controller 40 together with the first and the second overhead insertion circuits 33 and 38 in a manner to be described later.

Figure 6:
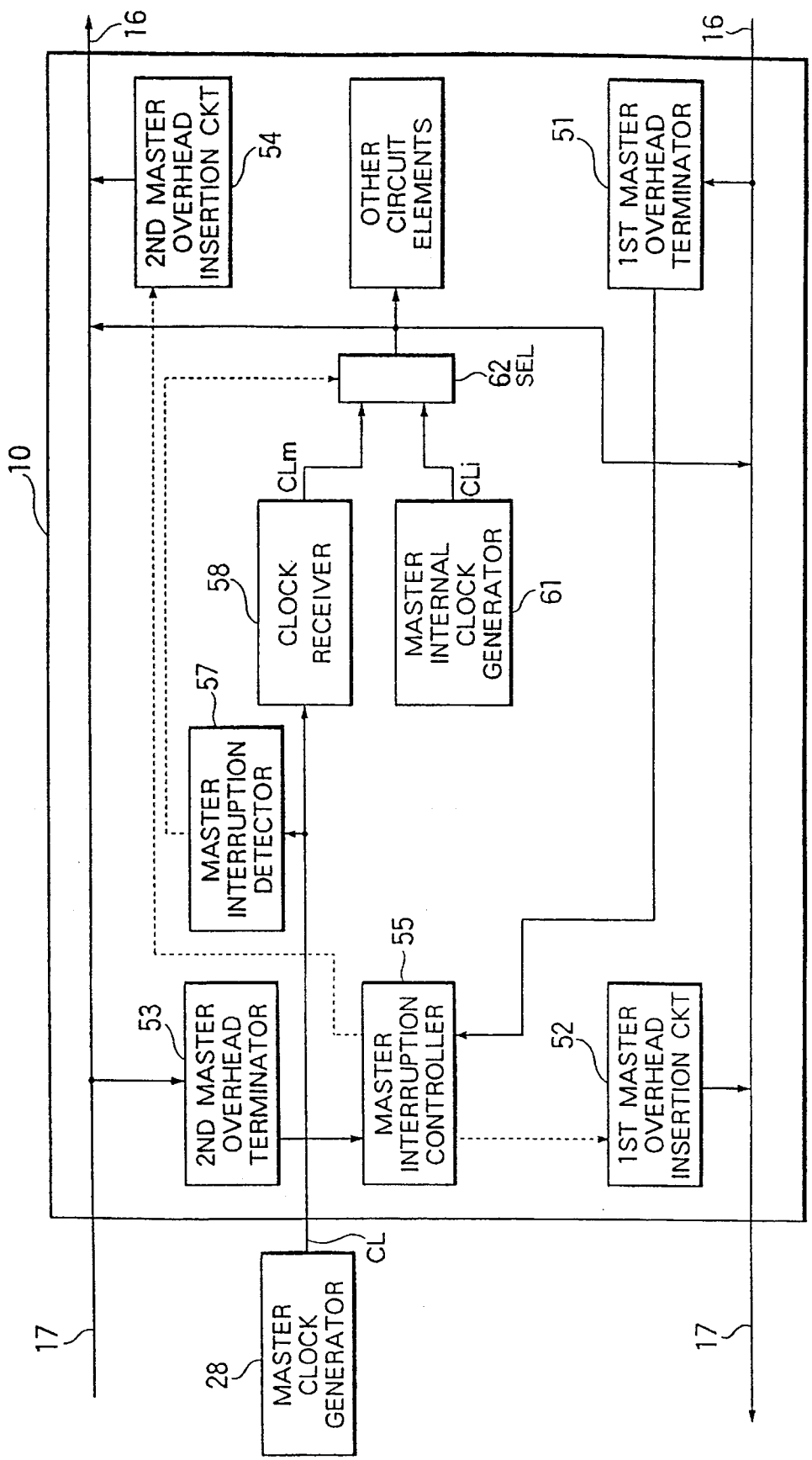
FIG. 6 is a block diagram of a master transmission device illustrated in FIGS. 3 and 4.

Referring to FIG. 6, the master transmission device 10 is formed so that the outer information signal is received from the outer transmission line 16 to be sent as the inner information signal to the inner transmission line 17 while the inner information signal is received from the inner transmission line 17 to be sent as the outer information signal to the outer transmission line 16, as illustrated in FIG. 6. The illustrated master transmission device 10 comprises a first master overhead terminator 51 connected to the outer transmission line 16, a first master overhead insertion circuit 52 connected to the inner transmission line 17, a second master overhead terminator 53 connected to the inner transmission line 17, and a second master overhead insertion circuit 54 connected to the outer transmission line 16. Each of the first and the second master overhead terminators 51 and 52 detects an overhead from the outer and the inner information signals sent through the outer and the inner transmission lines 16 and 17 and produces an overhead signal representative of each overhead. The overhead signals are delivered to a master overhead controller 55 which serves to analyze each overhead signal and to send master control signals to various portions of the master transmission device 10 in a manner to be described later.

The illustrated master transmission device 10 is supplied from the master clock generator 20 (illustrated in FIG. 3) with an original master clock pulse sequence CL. The master clock generator 20 may be included in the master transmission device 10, although it is located outside of the master transmission device 10 in FIG. 6. The original master clock pulse sequence is delivered to a master interruption detector 57 and a clock receiver 58. The master interruption detector 57 is operable to detect interruption of the original master clock pulse sequence while the clock receiver 58 is operable to retime the original master clock pulse sequence into an intermediate clock pulse sequence (depicted at CLm).

Like in the slave transmission device 1n illustrated in FIG. 5, a master internal clock generator 61 is included in the master transmission device 10 to produce a master internal clock sequence CLi. The intermediate clock pulse sequence CLm and the master internal clock sequence CLi are sent to a selector 62 controlled by the master interruption detector 57. Specifically, when the master interruption detector 57 detects interruption of the original master clock pulse sequence, the selector 62 selects the master internal clock sequence CLi as the master clock pulse sequence. Otherwise, the selector 62 selects the intermediate clock pulse sequence CLm as the master clock pulse sequence.

At any rate, the master clock pulse sequence is delivered to other internal elements of the master transmission device 10 on one hand and to both the outer transmission line 16 and the inner transmission line 17 on the other hand, although each slave transmission device is synchronized with the master clock pulse sequence sent from the outer transmission line 16.

In the example being illustrated, the master overhead controller 55 controls the first master overhead insertion circuit 52 to insert the switch indication signal (depicted at SW in FIG. 3) in the overhead and to send the switch indication signal SW to the inner transmission line 17, like in FIGS. 3(C) through (E).

Figure 7:
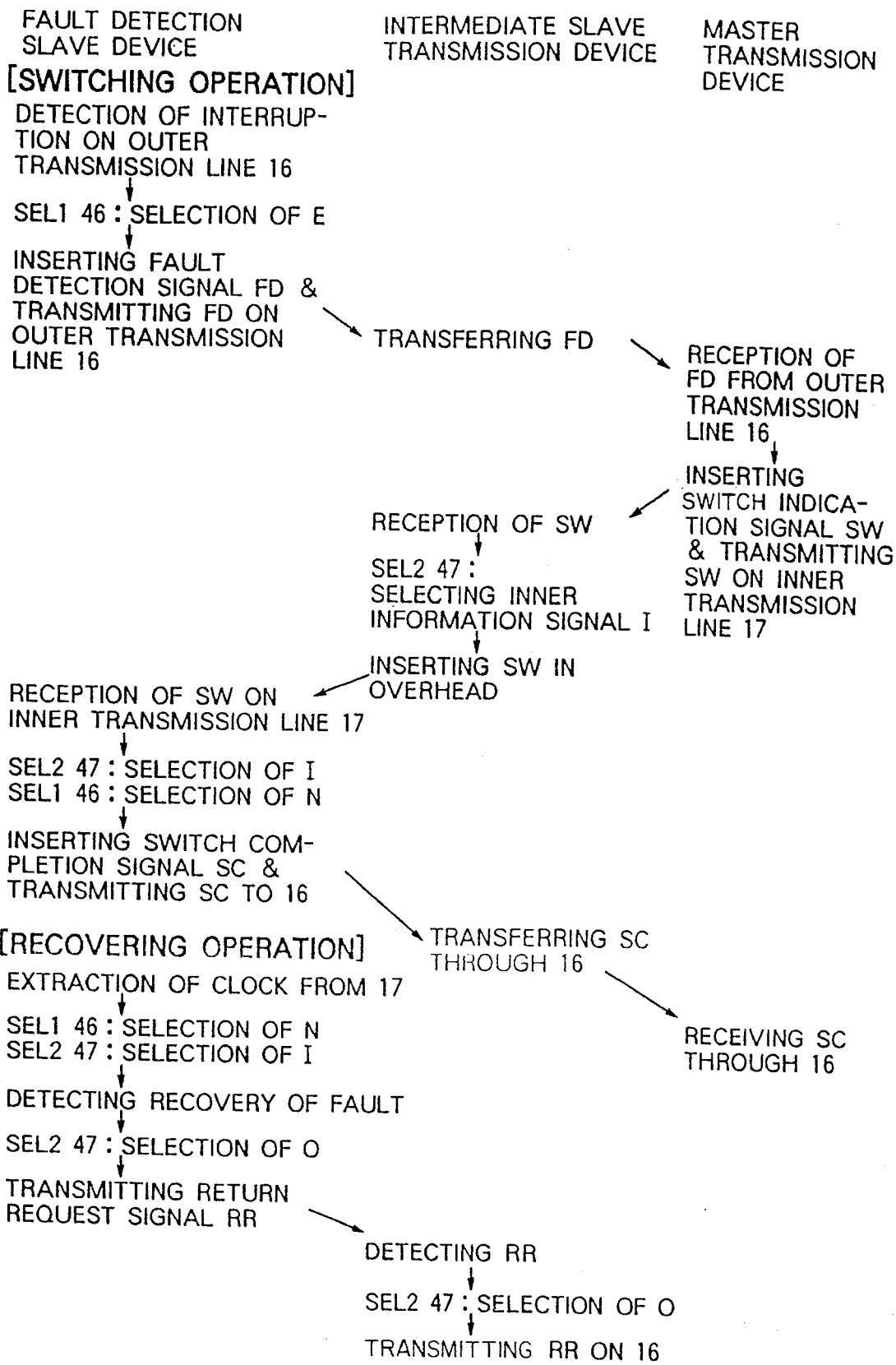
FIG. 7 is a time chart for use in describing operation of the slave and the master transmission devices illustrated in FIGS. 5 and 6.

Referring to FIG. 7 together with FIGS. 5 and 6, description will be made about operation of the slave and the master transmission devices 1n and 10. In FIG. 5, the master clock pulse sequence is monitored in the normal state by the first interruption detector 31 connected to the outer transmission line 16 of each slave transmission device 31. When interruption of the master clock pulse sequence is detected by the first interruption detector 31, the overhead controller 40 indicates occurrence of a fault to the first overhead insertion circuit 33. Subsequently, the overhead controller 40 supplies the control signals to the first and the second selectors 46 and 47 and to the second overhead insertion circuit 38, as illustrated by the broken lines.

Herein, it is to be noted that the second selector 47 is supplied with the outer and the inner information signals (depicted at O and I in FIG. 5) through the outer and the inner transmission lines 16 and 17, respectively, to select the outer information signals O in the normal state and to send the same to the clock extraction circuit 42. The clock extraction circuit 42 extracts the master clock pulse sequence from the outer information signal O which is supplied to the first selector 46 as a first internal clock pulse sequence N. In addition, the first selector 46 is given a second internal clock pulse sequence E from the internal clock generator 41. Under the circumstances, the first selector 46 selects the first internal clock pulse sequence N in the normal state. Otherwise, the first selector 46 selects the second internal clock pulse sequence E. As a result, a selected one of the first and the second internal clock pulse sequences N and E is delivered to the other circuit elements of the slave transmission device in on one hand and is also delivered through the outer and the inner transmission lines 16 and 17 as external clock pulse sequences to next following transmission devices on the other hand. As long as no fault occurs on the outer transmission line 16 in the normal state, the first internal clock pulse sequence is delivered to the other circuit elements of the slave transmission device 1n and to the next following transmission device located in the counterclockwise direction, as mentioned in conjunction with FIG. 3. Inasmuch as the first internal clock pulse sequence produced as the external clock pulse sequence is substantially identical with the master clock pulse sequence, the master clock pulse sequence may be considered as being repeated at each of the slave transmission devices.

In FIG. 5, let the first interruption detector 31 of the illustrated slave transmission device in detect the interruption of the master clock pulse sequence sent through the outer transmission line 16. Accordingly, the slave transmission device in which detects the interruption of the master clock pulse sequence will be referred to as a fault detection slave device. In this event, the overhead controller 40 of the fault detection slave device makes the second and the first selectors 47 and 46 select the inner information signal I and the second internal clock pulse sequence E, respectively. Consequently, the second internal clock pulse sequence E is sent from the first selector 46 as the internal clock pulse sequence to the other circuit elements of the slave transmission device in and is also sent to the outer transmission line 16, as shown in FIG. 5. This means that switching operation is carried out so as to switch from the outer transmission line 16 to the inner transmission line 17 and, as a result, to switch from the master clock pulse sequence to the second internal clock pulse sequence E in the fault detection slave device, as shown in FIG. 7.

On detection of the interruption of the master clock pulse sequence, the overhead controller 37 supplies the first overhead insertion circuit 33 with the control signal to make the first overhead insertion circuit 33 produce the fault detection signal FD representative of occurrence of the interruption. From this fact, it is readily understood that the overhead insertion circuit 33 comprises a circuit for producing the fault detection signal FD in response to the control signal given from the overhead controller 40. The fault detection signal is located or inserted in the overhead of the outer information signal and sent through the outer transmission line 16 towards the master transmission device 10 in synchronism with the second internal clock pulse sequence E, as illustrated in FIG. 7.

The fault detection signal FD will be passed through another one of the slave transmission devices that may be called an intermediate slave transmission device. The intermediate slave transmission device detects occurrence of the interruption and is operable in a manner similar to the normal state. In this connection, the intermediate slave transmission device is operable in synchronism with the second internal clock pulse sequence. This means that the first and the second selectors 46 and 47 are not switched by the overhead controller 40 of the intermediate slave transmission device. Thus, the fault detection signal FD which is inserted in the overhead of the outer information signal is repeated by the intermediate slave transmission device to be transferred to the master transmission device 10, as illustrated in FIGS. 6 and 7.

In FIGS. 6 and 7, the overhead which includes the fault detection signal FD is received by the first master overhead terminator 51 of the master transmission device 10 and is sent to the master overhead controller 55. Detecting the fault detection signal FD, the master overhead controller 55 delivers the master control signal to the first master overhead insertion circuit 52 to make the same supply the switch indication signal SW to the inner transmission line 17. The switch indication signal SW is located or inserted in the overhead of the inner information signal by the first master overhead insertion circuit 52, as illustrated in FIG. 7. In other words, the first master overhead insertion circuit 52 comprises a circuit for producing the switch indication signal SW in response to the master control signal supplied from the master overhead controller 55 on detection of the fault detection signal FD.

Such a switch indication signal SW is successively received by each of the slave transmission devices 1n through the inner transmission line 17. In the intermediate slave transmission device, the inner information signal which includes the switch indication signal SW is received by the second overhead terminator 37 of the intermediate slave transmission device as illustrated in FIG. 5 and is sent to the overhead controller 40 to detect the switch detection signal SW. On detection of the switch detection signal SW, the overhead controller 40 supplies the second selectors 47 with the control signal to select the inner information signal I. As a result, the clock extraction circuit 42 extracts the master clock pulse sequence from the inner information signal I to be sent to the first selector 46 which selects the first internal pulse sequence N. This shows that the second selector 47 is switched by reception of the switch indication signal SW, as shown in FIG. 7. In addition, the second overhead insertion circuit 38 of the intermediate slave transmission device is controlled by the overhead controller 40 to insert the switch indication signal SW into the overhead. Thus, the switch indication signal SW is repeated by the intermediate slave transmission device and is transmitted through the inner transmission line 17 to the fault detection slave device illustrated in FIG. 5.

When the switch indication signal SW is sent through the inner transmission line 17 and is received by the second overhead terminator 37 of the fault detection slave device illustrated in FIG. 5, the overhead controller 40 detects the switching indication signal SW from the overhead and controls the first and the second selectors 46 and 47 by delivering the control signals to the first and the second selectors 46 and 47. Specifically, the second selector 47 selects the inner information signal I sent through the inner transmission line 17, to supply the inner information signal I to the clock extraction circuit 42 and to extract the master clock pulse sequence from the inner information signal as the first internal clock pulse sequence N. On the other hand, the first selector 46 selects the first internal clock pulse sequence N in response to the control signal, as illustrated in FIG. 7. Thus, the fault detection slave device is operable in synchronism with the master clock pulse sequence sent through the inner transmission line 17.

Under the circumstances, the overhead controller 40 of the fault detection slave device controls the first overhead insertion circuit 33 to insert the switch completion signal SC into the overhead sent from the fault detection slave device and to transmit the same to the outer transmission line 16, as illustrated in FIG. 7.

The switch completion signal SC is transferred to the intermediate slave transmission device and is thereafter transferred to the master transmission device 10 through the outer transmission line 16, as illustrated in FIG. 7.

Referring to FIGS. 5, 6, and 7 again, description will be made about the recovering operation which is carried out after the fault is recovered. Before recovery of the fault, the master and the slave transmission devices 10 and in are operated in the above-mentioned manner. This shows that each of the slave transmission devices in extracts the master clock pulse from the inner transmission line 17 and that the first and the second selectors 46 and 47 select the inner information signal I and the first internal clock pulse sequence N illustrated in FIG. 5, respectively, as illustrated in FIG. 7. In this situation, when the overhead controller 40 of the fault detection slave device detects recovery of the fault by monitoring the first interruption detector 31 connected to the outer transmission line 16, the second selector 47 is switched to select the outer information signal O sent through the outer transmission line 16, as illustrated in FIG. 7. The return request signal RR is transmitted through the outer transmission line 16 to the intermediate slave transmission device in synchronism with the master clock pulse sequence sent through the outer transmission line 16.

In the intermediate slave transmission device, the return request signal RR is detected by the overhead controller 40 by monitoring the overhead in the first overhead terminator 31. The second selector 47 is switched by the overhead controller 40 of the intermediate slave transmission device to select the outer information signal O. Thereafter, the return request signal RR is sent from the-first overhead insertion circuit 33 of the intermediate slave transmission device through the outer transmission line 16 to the master transmission device 10.

The master transmission device 10 detects the return request signal by monitoring the overhead sent through the outer transmission line 16.

The above-mentioned operation of the slave and the master transmission devices can be structured by a microprocessor operable in accordance with a software program.

Figure 8:
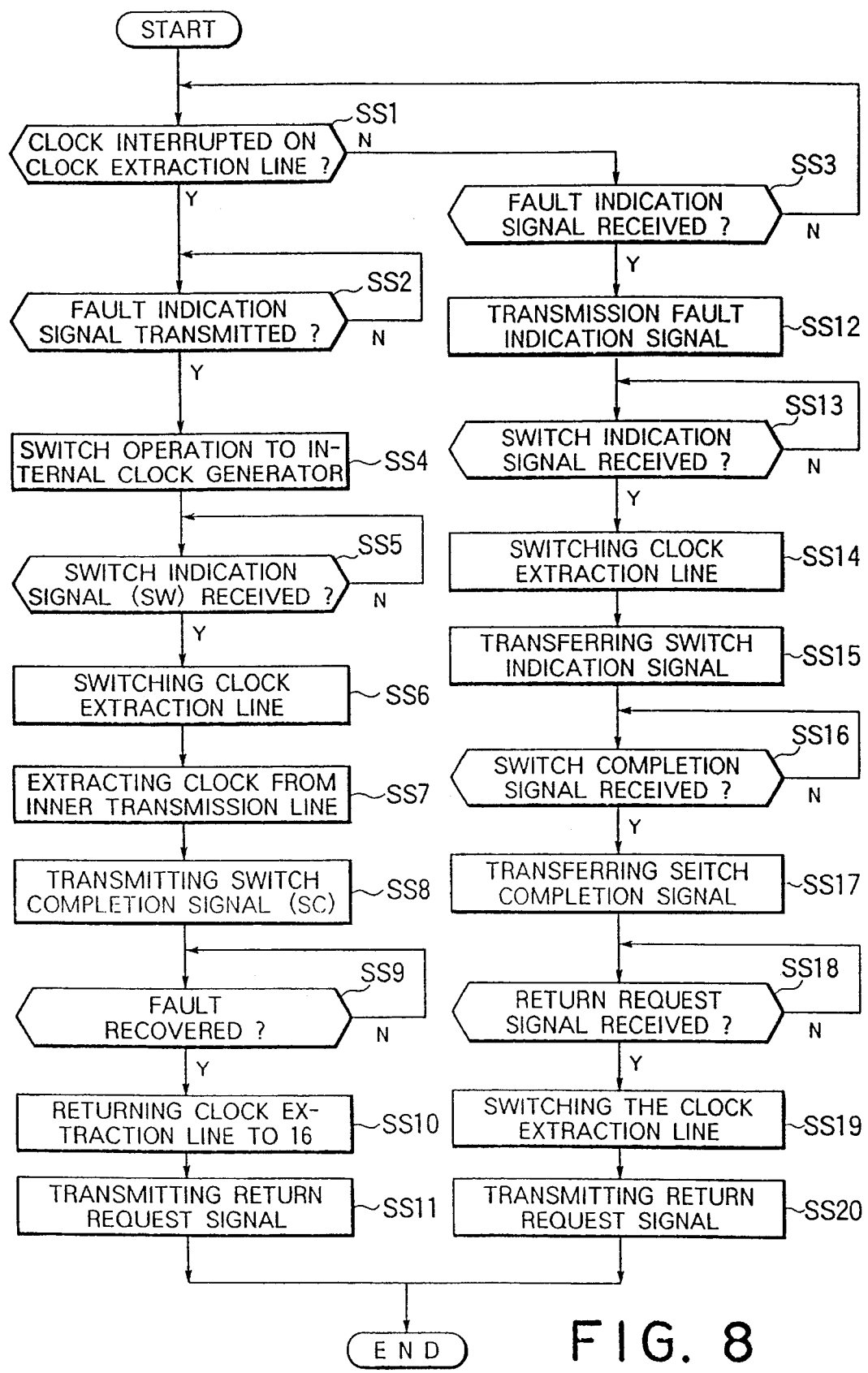
FIG. 8 is a flow chart for use in describing a software program which carries out operation of the slave transmission device.
Figure 9:
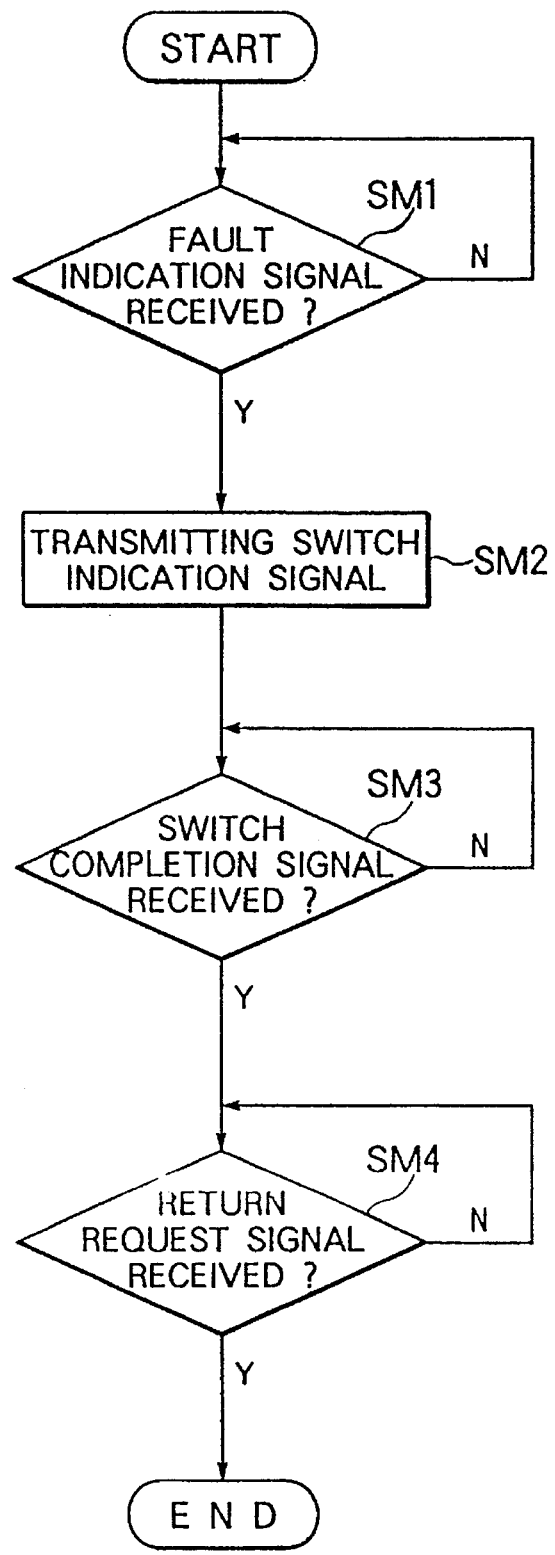
FIG. 9 is a flow chart for use in describing a software program which carries out operation of the master transmission device.

Referring to FIGS. 8 and 9, a software program is exemplified so as to execute the slave and the master transmission devices 1n and 10, respectively, and is illustrated in the form of flow charts. Each slave transmission device starts operation and carries out a first slave step SS1 so as to detect whether or not the master clock pulse sequence is interrupted on the outer transmission line 16 which may be called a clock extraction line. On detection of the interruption of the master clock pulse sequence, the first slave step SS1 is followed by a second slave step SS2. In this event, the slave transmission device is operable as the fault detection slave device. Otherwise, the first slave step SS1 is succeeded by a third slave step SS3 which may make the slave transmission device in question act as the intermediate slave transmission device, as will become clear as the description proceeds.

At the second slave step SS2, it is judged whether or not the fault indication signal FD is transmitted from the slave transmission device onto the outer transmission line 16. The second slave step SS2 lasts until transmission of the fault indication signal FD. After transmission of the fault indication signal FD, switching operation is carried out at a fourth slave step SS4 to select the internal clock pulse sequence generated by an internal clock generator. A fifth slave step SS5 follows the fourth slave step SS4 to detect whether or not the switch indication signal SW is received from the master transmission device 10 through inner transmission line 17. Subsequently, a clock extraction line is switched from the outer transmission line 16 to the inner transmission line 17 at a sixth slave step SS6. At a seventh slave step SS7, the master clock pulse sequence is extracted from the inner or switched transmission line 17. Thereafter, the switch completion signal SC is transmitted through the outer transmission line 16 at an eighth slave step SS8 which is succeeded by a ninth slave step SS9. At the ninth slave step SS9, judgement is made whether or not the fault is recovered on the outer transmission line 16. The ninth slave step SS9 is repeated until recovery of the fault is detected by the fault detection slave device. Once the fault is recovered, the ninth slave step SS9 is followed by a tenth slave step SS10 at which the clock extraction line is returned back to the outer transmission line 16 and which is succeeded by an eleventh slave step SS11 to transmit the return request signal RR. Thus, the fault detection slave device finishes operation.

On the other hand, when no interruption of the master clock pulse sequence is detected at the first slave step SS1, it is judged at the third slave step SS3 whether or not the fault indication signal FD is transmitted through the clock extraction line. The slave transmission device repeats the first and the third slave steps SS1 and SS3 until the fault indication signal FD is received by the slave transmission device. On reception of the fault indication signal FD, the third slave step SS3 is followed by a twelfth slave step SS12 at which the fault indication signal FD is transferred from the slave transmission device downwards on the clock extraction line, namely, the outer transmission line. At a thirteenth slave step SS13, it is judged whether or not the switch indication signal SW is received from the master transmission device 10 through the inner transmission line 17. When the switch indication signal SW is received at the thirteenth slave step SS13, the clock extraction line is switched from the outer transmission line 16 onto the inner transmission line 17 at a fourteenth slave step SS14. The switch indication signal SW is transferred from the slave transmission device onto the inner transmission line 17 at a fifteenth slave step SS15.

After the fifteenth slave step SS15, a sixteenth slave step SS16 is executed to detect whether or not the switch completion signal SC is received through the outer transmission line 16 from the fault detection slave device. The switch completion signal SW is transferred through the outer transmission line 16 towards the master transmission device 10 at a seventeenth slave step SS17. Thereafter, the slave transmission device is put into a standby state at an eighteenth slave step SS18 to wait for receiving a return request signal RR. On reception of the return request signal RR, the clock extraction line is switched from the inner transmission line 17 to the outer transmission line 16 at a nineteenth slave step SS19. Subsequently, the return request signal RR is transferred from the slave transmission device through the outer transmission line 16 at a twentieth slave step SS20. Thus, the recovery operation is completed.

In FIG. 9, the master transmission device 10 starts operation from a first master step SM1 to detect whether or not the fault indication signal FD is received through the outer transmission line from the fault detection slave device. On reception of the fault indication signal FD, the master transmission device 10 transmits the switch indication signal SW through the inner transmission line 17 to the slave transmission devices at a second master step SM2. At a third master step SM3, it is judged whether or not the switch completion signal SC is received by the master transmission device 10 through the outer transmission line 16. Subsequently, the master transmission device 10 detects whether or not the return request signal RR is received through the outer transmission line 16. On detection of the return request signal RR, operation is finished in the master transmission device 10.

While this invention has thus far been described in conjunction with a preferred embodiment thereof, it will readily be possible for those skilled in the art to put this invention into practice in various other manners. For example, the fault detection device may be the master transmission device 10, although description has been made about the case where interruption is detected by the master transmission device.

What is claimed is:

1. A method of recovering a sequence of clock pulses in a ring-shaped synchronization network in which a master transmission device and a plurality of slave transmission devices are connected in a ring shape to one another and are communicable with one another in clockwise and counterclockwise directions through clockwise and counterclockwise transmission paths, respectively, a master clock pulse sequence being transmitted in a normal state from said master transmission device in a selected one of the clockwise and the counterclockwise directions, wherein each of said slave transmission devices operates in accordance with said master clock pulse sequence in said normal state, the method comprising the steps of:

detecting, in one of said slave transmission devices, interruption of said master clock pulse sequence sent from said master transmission device in said selected one of the clockwise and the counterclockwise directions through a selected one of the clockwise and counterclockwise transmission paths, to detect an extraordinary state different from said normal state;

switching operation of said one of said slave transmission devices from said master clock pulse sequence to an internal clock pulse sequence on detecting the interruption of said master clock pulse sequence;

informing, via interruption information supplied from said one of said slave transmission devices, and any intervening slave transmission devices, said master transmission device, of the interruption of the master clock pulse sequence, which is supplied to said master transmission device in accordance with said internal clock pulse sequence in the selected one of the clockwise and the counterclockwise directions;

transferring the master clock pulse sequence from said master transmission device to said slave transmission devices in a remaining one of the clockwise and the counterclockwise directions that is reverse to said selected one of the clockwise and the counterclockwise directions after said internal clock pulse sequence together with said interruption information is received by said master transmission device; and delivering said master clock pulse sequence to said slave transmission devices through the remaining one of the clockwise and the counterclockwise transmission paths opposite to the selected one of the clockwise and the counterclockwise transmission paths by successively switching the selected one of the clockwise and the counterclockwise transmission paths to the remaining one of the clockwise and the counterclockwise transmission paths beginning with a nearest one of said slave transmission devices nearest to said master transmission device, to said one of said slave transmission devices.

2. A method as claimed in claim 1, further comprising the step of:

transmitting, between said informing step and said transferring step, a switching signal from said master transmission device to said one of said slave transmission devices, and any intervening slave transmission devices,.in the remaining one of the clockwise and the counterclockwise directions, said switching signal being representative of switching the direction of the master clock pulse sequence from the selected one of the clockwise and the counterclockwise directions to the remaining one of the clockwise and the counterclockwise directions.

3. A method as claimed in claim 2, further comprising the step of:

sending a switching completion signal from said one of said slave transmission devices to said master transmission device when the switching signal is received by said one of said slave transmission devices.

4. A method as claimed in claim 1, further comprising the steps of:

transmitting a recovery request signal from said one of said slave transmission devices to said master transmission device in the selected one of the clockwise and the counterclockwise directions when recovery of the interruption is detected by said one of said slave transmission devices; and switching the direction of said master clock pulse sequence from the remaining one of the clockwise and the counterclockwise directions to said selected one of the clockwise and the counterclockwise directions on recovery of said interruption.

5. A clock pulse recovery system for use in a ring-shaped synchronization network in which a master transmission device and a plurality of slave transmission devices are connected in a ring shape to one another and are communicable with one another in clockwise and counterclockwise directions through a selected one of clockwise and counterclockwise transmission paths, and in which a master clock pulse sequence is transmitted in a normal state from said master transmission device in a selected one of the clockwise and the counterclockwise directions, wherein each of said slave transmission devices operates in accordance with said master clock pulse sequence in said normal state, at least one of said slave transmission devices comprising:

detecting means for detecting interruption of said master clock pulse sequence sent from said master transmission device in said selected one of the clockwise and the counterclockwise directions, to detect an extraordinary state different from said normal state;

switching means for switching operation from said master clock pulse sequence to an internal clock pulse sequence on detecting said interruption of said master clock pulse sequence; and informing means for informing said master transmission device of the interruption of said master clock pulse sequence via interruption information sent in accordance with said internal clock pulse sequence in the selected one of the clockwise and the counterclockwise directions;

said master transmission device comprising:

receiving means for receiving said internal clock pulse sequence together with said interruption information; and transferring means for transferring said master clock pulse sequence after reception of said interruption information to said at least one of said slave transmission devices which detected said interruption, and any intervening slave transmission devices, in a remaining one of the clockwise and the counterclockwise directions that is reverse to said selected one of the clockwise and the counterclockwise directions, to deliver said master clock pulse sequence to said slave transmission devices in the remaining one of the clockwise and the counterclockwise directions through a remaining one of the clockwise and the counterclockwise transmission paths opposite to the selected one of the clockwise and the counterclockwise transmission paths by successively switching the selected one of the clockwise and the counterclockwise transmission paths of said slave transmission devices to the remaining one of the clockwise and the counterclockwise transmission paths beginning with a nearest one of said slave transmission devices nearest to said master transmission device, to said at least one of said slave transmission devices.

6. A clock recovery system as claimed in claim 5, wherein said master transmission device further comprises:

transmitting means for transmitting a switching signal from said master transmission device to said at least one of said slave transmission devices, and any intervening slave transmission devices, in the remaining one of the clockwise and the counterclockwise directions after the interruption of said master clock pulse sequence is informed from said at least one of said slave transmission devices, said switching signal being representative of switching the direction of said master clock pulse sequence from the selected one of the clockwise and the counterclockwise directions to the remaining one of the clockwise and the counterclockwise directions.

7. A clock recovery system as claimed in claim 6, wherein said at least one of said slave transmission devices further comprises:

sending means for sending a switching completion signal to said master transmission device when said switching signal is received by said at least one of said slave transmission devices.

8. A clock recovery system as claimed in claim 5, wherein said predetermined one of said slave transmission devices further comprises:

transmitting means for transmitting a recovery request signal to said master transmission device in the selected one of the clockwise and the counterclockwise directions when recovery of the interruption is detected by said at least one of said slave transmission devices;

said master transmission device further comprising:

switching means for switching the direction of said master clock pulse sequence from the remaining one of the clockwise and the counterclockwise directions to said selected one of the clockwise and the counterclockwise directions on recovery of said interruption.

* * * * *

UNITED STATES PATENT AND TRADEMARK OFFICE
CERTIFICATE OF CORRECTION

PATENT NO. : 5,499,275
DATED : March 12, 1996
INVENTOR(S) : Kaori KISHI

It is certified that error appears in the above-indentified patent and that said Letters Patent is hereby corrected as shown below:

Column 6, line 42, delete "in" and insert --1n--.

Column 8, line 59, delete "in" and insert --1n--.

Column 9, line 1, delete "in" and insert --1n--.

Column 10, line 43, delete "in" and insert --1n--.

Signed and Sealed this

Twenty-third Day of July, 1996

Attest:

BRUCE LEHMAN

Attesting Officer

Commissioner of Patents and Trademarks